US007082605B2

(12) United States Patent
Alletson et al.

(10) Patent No.: US 7,082,605 B2
(45) Date of Patent: Jul. 25, 2006

(54) CONTINGENCY PLANNING IN A SCHEDULING PROCESS

(75) Inventors: Ian S Alletson, Rochdale (GB);
Dionisios Pothos, London (GB);
Robert NW Laithwaite, Ipswich (GB);
Geoff Lowndes, Stoke on Trent (GB)

(73) Assignee: Vidus Limited, Suffolk (GB)

( * ) Notice: Subject to any disclaimer, the term of this patent is extended or adjusted under 35 U.S.C. 154(b) by 447 days.

(21) Appl. No.: 10/239,086

(22) PCT Filed: Mar. 1, 2001

(86) PCT No.: PCT/GB01/00892

§ 371 (c)(1),
(2), (4) Date: Sep. 19, 2002

(87) PCT Pub. No.: WO01/75702

PCT Pub. Date: Oct. 11, 2001

(65) Prior Publication Data

US 2003/0050065 A1    Mar. 13, 2003

(30) Foreign Application Priority Data

Mar. 31, 2000 (EP) .................................. 00302750

(51) Int. Cl.
*G06F 9/46* (2006.01)
(52) U.S. Cl. ....................... 718/100; 718/104
(58) Field of Classification Search ............... 718/100, 718/102, 104; 705/7, 8; 700/100, 108, 182, 700/99
See application file for complete search history.

(56) References Cited

U.S. PATENT DOCUMENTS 4,852,001 A * 7/1989 Tsushima et al. ............... 705/8
5,408,663 A * 4/1995 Miller ........................ 718/104
5,615,121 A * 3/1997 Babayev et al. ............... 705/9

(Continued)

FOREIGN PATENT DOCUMENTS

WO    WO 96 27171 A    9/1996

(Continued)

OTHER PUBLICATIONS

Garwood et al.; "Work Management System"; British Telecommunications Engineering; vol. 10, No. 3; Oct. 1, 1991; pp. 204-210; XP000279039.

(Continued)

*Primary Examiner*—Majid Banankhah
(74) *Attorney, Agent, or Firm*—Nixon & Vanderhye P.C.

(57) ABSTRACT

Tasks (T) such as repair jobs on a telecommunications system, that are to be performed by a plurality of resources such as field engineers (E), at different locations in a geographical area (2), are scheduled by means of a scheduler (10) at a work manager server (5). The scheduler provides schedule data (11) corresponding to schedules of the tasks that individual ones of the resources are to carry out, from task data (4) concerning the tasks to be carried out and resource data (6) concerning characteristics of resources available to carry out the tasks over a given period. The scheduled tasks are provided with associated contingency values (C) which are each computed as a function of the difference between the time that a task is scheduled to start and the latest start time that is feasible for the task . The schedule data (11) is downloaded to a workstation (7). The downloaded data is displayed on a Gantt Chart and the task blocks on the display are colour coded according to their contingency values (C) to give a visual indication of their values.

11 Claims, 7 Drawing Sheets

U.S. PATENT DOCUMENTS

| | | | | |
|---|---|---|---|---|
| 5,826,236 | A | * | 10/1998 | Narimatsu et al. ............. 705/8 |
| 5,890,134 | A | * | 3/1999 | Fox ................................ 705/9 |
| 5,943,652 | A | | 8/1999 | Sisley et al. |
| 6,578,005 | B1 | * | 6/2003 | Lesaint et al. ................. 705/8 |
| 2003/0229529 | A1 | | 12/2003 | Mui et al. |

FOREIGN PATENT DOCUMENTS

| | | |
|---|---|---|
| WO | WO 98 22897 A | 5/1998 |

OTHER PUBLICATIONS

Tsui et al.; "Intelligent Multi-Model Systems"; BT Technology Journal; vol. 16, No. 3; Jul. 1, 1998; pp. 134-144; XP000781608.

Creemers et al; "Smart Schedules Streamline Distribution Maintenance"; IEEE Computer Applications in Power; vol. 11, No. 3; Jul. 1998; pp. 48-53; XP0021466160.

* cited by examiner

CONTINGENCY PLANNING IN A SCHEDULING PROCESS

This application is the US national phase of international application PCT/GB01/00892 filed 1 Mar. 2001 which designated the U.S.

BACKGROUND

1. Technical Field

This invention relates to improvements in scheduling tasks to be performed by a plurality of resources, for example tasks carried out by field engineers on a telecommunications system that extends over a wide area such as a country or state.

2. Description of Related Art

In our PCT/WO98/22897, a scheduling system is described which may be used for a telecommunications system in order to schedule repair tasks to be performed on the system by field engineers. Telecommunications systems conventionally are provided with automatic fault monitoring systems that report repair tasks to be carried out by field engineers and scheduling systems may be provided to communicate schedules of tasks to the field engineers. The engineers then travel from location to location carrying out the tasks, reporting when tasks are completed to the scheduler through a portable computer. The scheduler described in our aforesaid PCT application dynamically updates the schedules for the individual engineers depending on workload and engineer availability, which vary dynamically.

The present invention seeks to improve upon this prior system.

BRIEF SUMMARY OF NON-LIMITING EXEMPLARY EMBODIMENTS

According to the invention there is provided a method of scheduling tasks to be performed by means of a plurality of resources, comprising providing schedule data corresponding to schedules of the tasks that individual ones of the resources are to carry out, prepared from task data concerning the tasks to be carried out and resource data concerning characteristics of resources available to carry out the tasks over a given period, together with contingency values associated with the scheduled tasks for the individual resources.

The schedule data may be displayed for example on a Gantt chart, so that scheduled tasks for the resources are shown individually with an associated visual indication of their contingency values for example in different colours according to the contingency values.

The schedule data may relate to tasks to be performed on a telecommunications system and the resource data may relate to field engineers to perform the tasks.

The contingency values may each computed as a function of the difference between the time that a task is scheduled to start and the latest start time that is feasible for the task.

The invention also includes a program to be run on a computer to perform the inventive method, together with apparatus configured to perform the method.

BRIEF SUMMARY OF THE DRAWINGS

In order that the invention may be more fully understood, an embodiment thereof will now be described by way of example with reference to the accompanying drawings in which.

DETAILED DESCRIPTION OF NON-LIMITING EXEMPLARY EMBODIMENTS

System Overview

Figure 1:
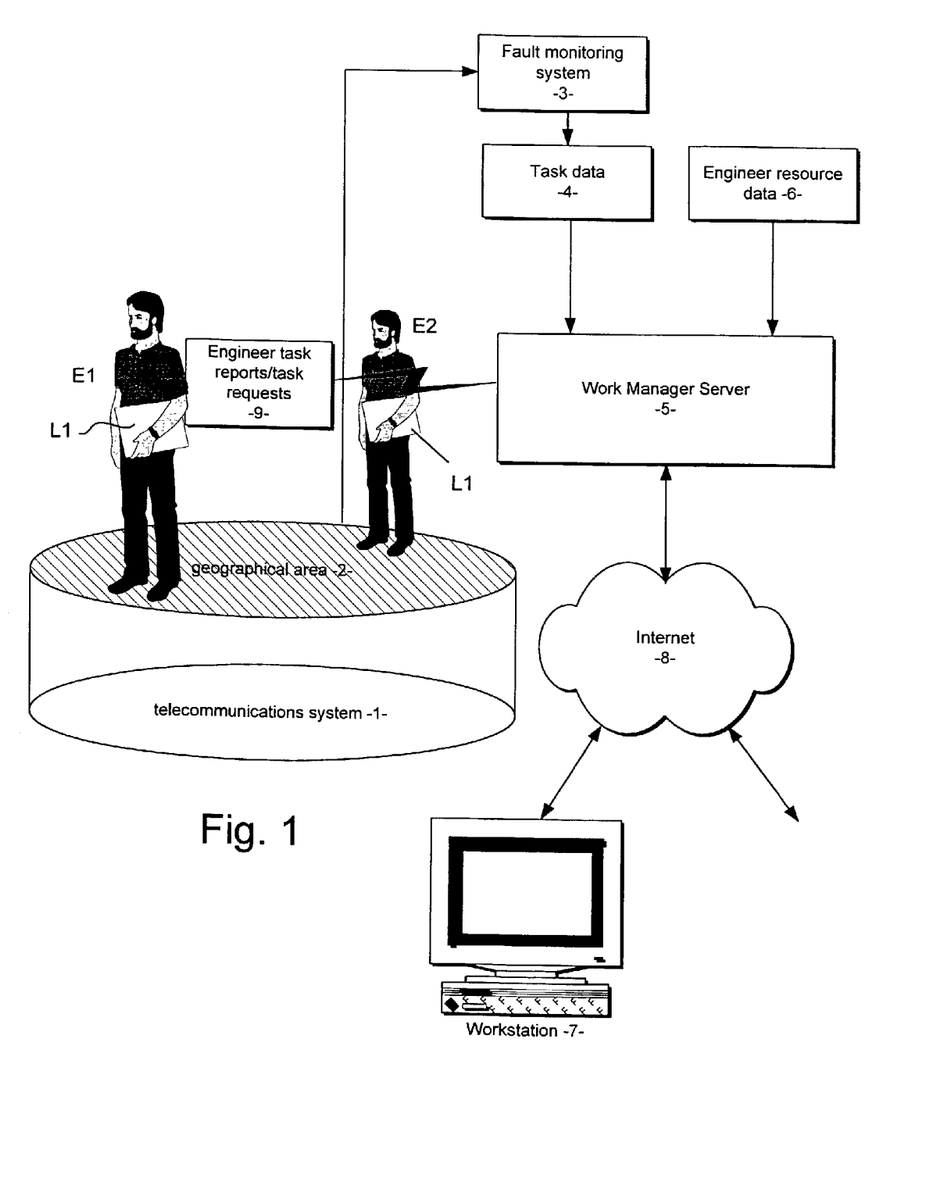
FIG. 1 is a schematic overview of a system for carrying out repair tasks on a telecommunications system.

An overview of the system according to the invention is shown in FIG. 1, for scheduling tasks to be carried out on a telecommunications system 1, shown schematically to extend over a geographical area 2. Engineers E1, E2 . . . En carry out tasks on the telecommunications system to keep it in good repair.

It will be understood that the telecommunications system may extend over a large geographical area such as an entire country or state. Considering for example the United Kingdom (UK), there may be of the order of 20,000 people working on the system who typically carry out 150,000 tasks every day.

In order to simplify administration, the geographical area covered by the telecommunications system is broken down into service areas or domains which can be covered by individual groups of field engineers e.g. fifty engineers. For example, in country areas, the domains may cover geographical areas of the order of one county but in built-up areas, the geographical extent of a domain may be much smaller.

The telecommunications system may include a fault monitoring system 3 which identifies work to be carried out on the system. The fault monitoring system produces a list of tasks to be carried out by the field engineers together with information concerning the nature of the tasks and their geographical location. Each task is given an individual job identification number or JIN.

The resulting task data 4 is fed to a work manager server 5 that computes schedules of tasks to be carried out by the individual field engineers E1, E2 . . . En. The work manager server handles tasks for the entire telecommunications system 1 although may conveniently comprise a number of network server processors distributed around the country.

The work manager server 5 is additionally fed with information concerning the field engineers E1, E2 . . . En from an engineer data source 6. The engineer data includes rostering information i.e. holidays, sickness together with details of the skill level of the engineer for example whether they can work on telephone exchanges, optical fibres or other categories of system equipment. Each field engineer is given a personal identification number or PIN.

The engineers in each domain are organised in a number of individual organisational units which are given a unique organisational unit code or OUC. A (human) management controller for the domain is provided with a workstation 7 to receive management information concerning the schedules prepared for the individual engineers and other management information. The workstation 7 is configured to act as a client for the work manager server 5 and communication between the client and server is carried out by any suitable conventional method. In this example, communication is achieved through the Internet 8 although it will be appreciated that other wide area networks could be used. Thus, a plurality of workstations 7 communicate with the server 5 through the Internet 8 in order to provide management information to the individual organisational units associated with the domains. Only one workstation 7 is shown in FIG. 1 in order to simplify the description.

Each engineer E in the domain is provided with a mobile computing facility such as a hand held terminal e.g. the Husky model FS/2 produced by Husky Computers Limited of Coventry England or a conventional laptop computer L1, L2. This enables the engineers to communicate individually with the work manager server 5, typically through the telecommunications system 1 or alternatively by mobile IP. When an individual engineer E logs onto the server 5, an individual work schedule is provided to the engineer by the server 5. The server periodically updates the schedule to optimise task allocation to the individual engineers. Thus, when a engineer completes a task, a report is provided back to the work manager server 5 in order to enable the server to keep an account of work carried out and to update and optimise the schedules. After completion of an individual task, the engineer is then provided with details of the next task to be carried out. In FIG. 1, the communication of task completion reports and task requests is shown schematically by functional block 9.

Figure 2:
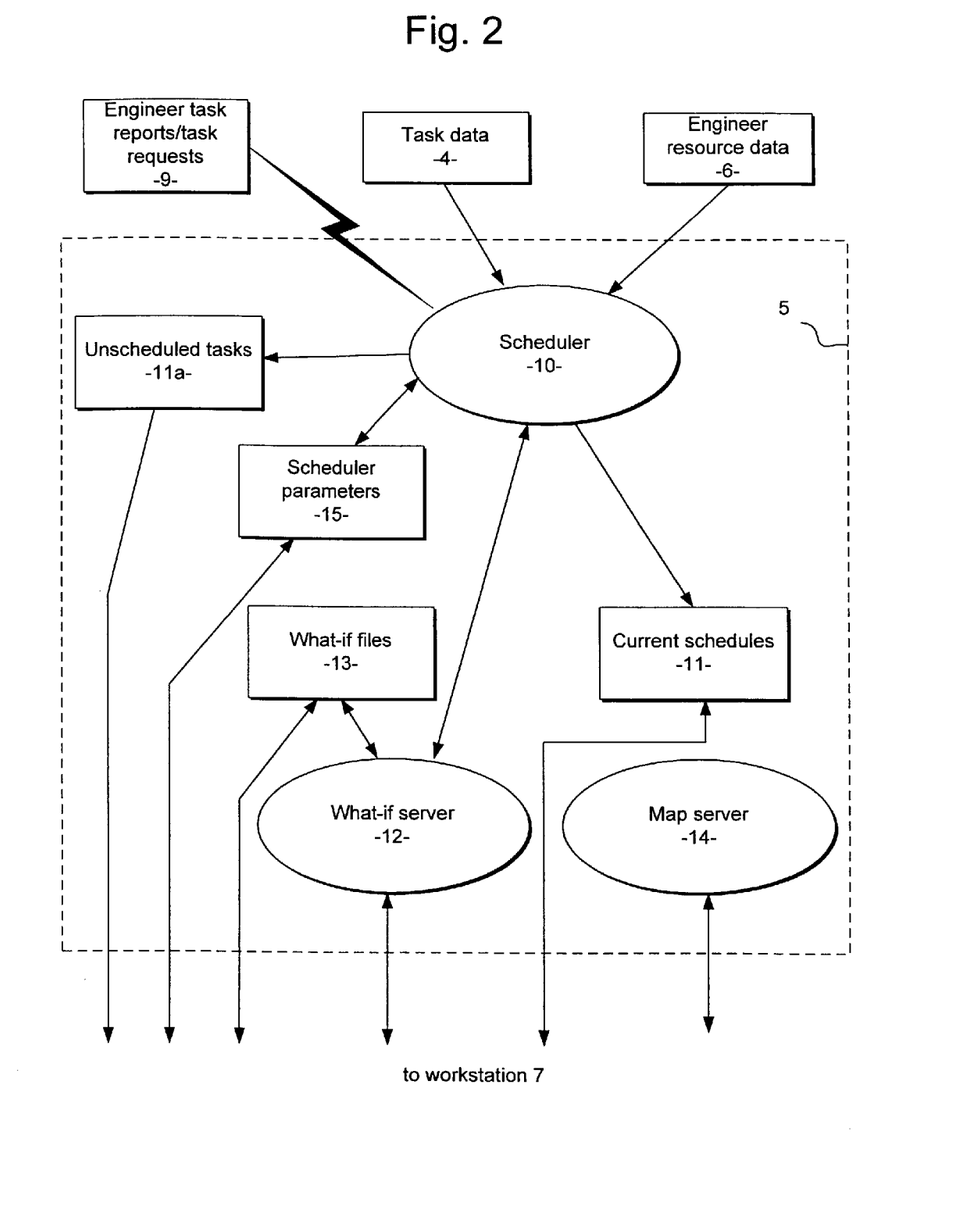
FIG. 2 is a schematic block diagram of the work manager server shown in FIG. 1.

The work manager server 5 is shown in more detail in FIG. 2 and comprises a general purpose computer configured to operate as a server and provide the functionality shown schematically within the hatched outline. The server 5 includes a scheduler 10 which receives the task data 4 and engineer data 6 together with the engineer reports 9. The scheduler 10 performs a simulated annealing algorithm to produce schedules for the individual engineers which are shown schematically as functional block 11. In practice, the schedule data produced by the scheduler 10 is stored in a database in a storage medium such as a hard disc (not shown).

Scheduler 10 may operate to generate an initial series of schedules allocating field engineers to the tasks. The initial schedules may be generated in a two-stage process in which a rule-based system allocates tasks selected as being difficult to allocate e.g. because they are linked to other tasks, and then a stochastic search system completes the rest of the schedule. Periodically the stochastic system may be interrupted to allow a further rule-based system to analyse the schedules created so far, and fix the best ones in the schedule, so that the stochastic system can then concentrate of improving the remaining schedules. This is referred to hereinafter as "hard scheduling" HS. In order to allow the scheduler to handle rapid changes in the requirements for tasks and the availability of field engineers, on a scale faster than the time required to generate the schedules, a schedule modification system is arranged to make changes in the short term, between the schedule updates delivered by the hard schedule generation system. This will be referred to as "simulated annealing" SA. The scheduler 10 is described in more detail in our co-pending PCT/W098/22897 to which reference is directed.

Even though the scheduler 10 can respond in essentially real time to new task data, there will remain some unscheduled tasks 11a which will need to be allocated to engineers. Details of the unscheduled tasks 11a may be stored with the schedules 11, although they are shown separately in FIG. 1 for purposes of clarity.

The work manager server 5 also includes a what-if server 12 which can be accessed by the OUCs from their workstations 7 to enable what-if scenarios to be investigated, to provide management information. The outcomes of such what-if investigations are held in files 13 for review by the workstations 7. The what-if server 12 communicates with the scheduler 10 to derive outcomes of what-if investigations.

The work manager server 5 further includes a map server 14 which provides map display data to the individual workstations. As explained later, this enables a map to be displayed corresponding to the domain for the OUC at the workstation 7. In this example, the map server 14 provides a map of the United Kingdom, using the UK National Grid map co-ordinate reference system, which has a predetermined relationship with latitude and longitude. The map is provided with details of the coverage areas of individual telephone exchanges. The engineer data 6 and task data 4 provides details of the location of the various engineers and tasks using the National Grid map co-ordinate reference system. Whilst in this example the map server is shown included in the work manager server 5, it will be understood that a separate map server could be provided at a different location, accessible through the Internet 8 by the individual workstations 7. Also, different map reference co-ordinate systems could be used.

As previously mentioned, the scheduler 10 uses a rule-based system for the HS/SA processes. The speed of computation and the outcome are a function of the parameters used to define the scheduling process. These scheduler parameters 15 can be modified and the outcome of changing the values of the scheduler parameters can be reviewed at the workstation 7 using the what-if server 12. The settings for the scheduler parameters 15 that were used to prepare a particular schedule 11, are made available to the workstation for use in the what-if processes.

The workstation may be permitted to change the scheduler parameters for the production of subsequent schedules. In practice, the scheduler parameter data 15 may be included with the current schedules but is shown separately in FIG. 2 for purposes of clarity.

Workstation 7—OUC

The hardware configuration of the workstation 7 is illustrated schematically in

Figure 3:
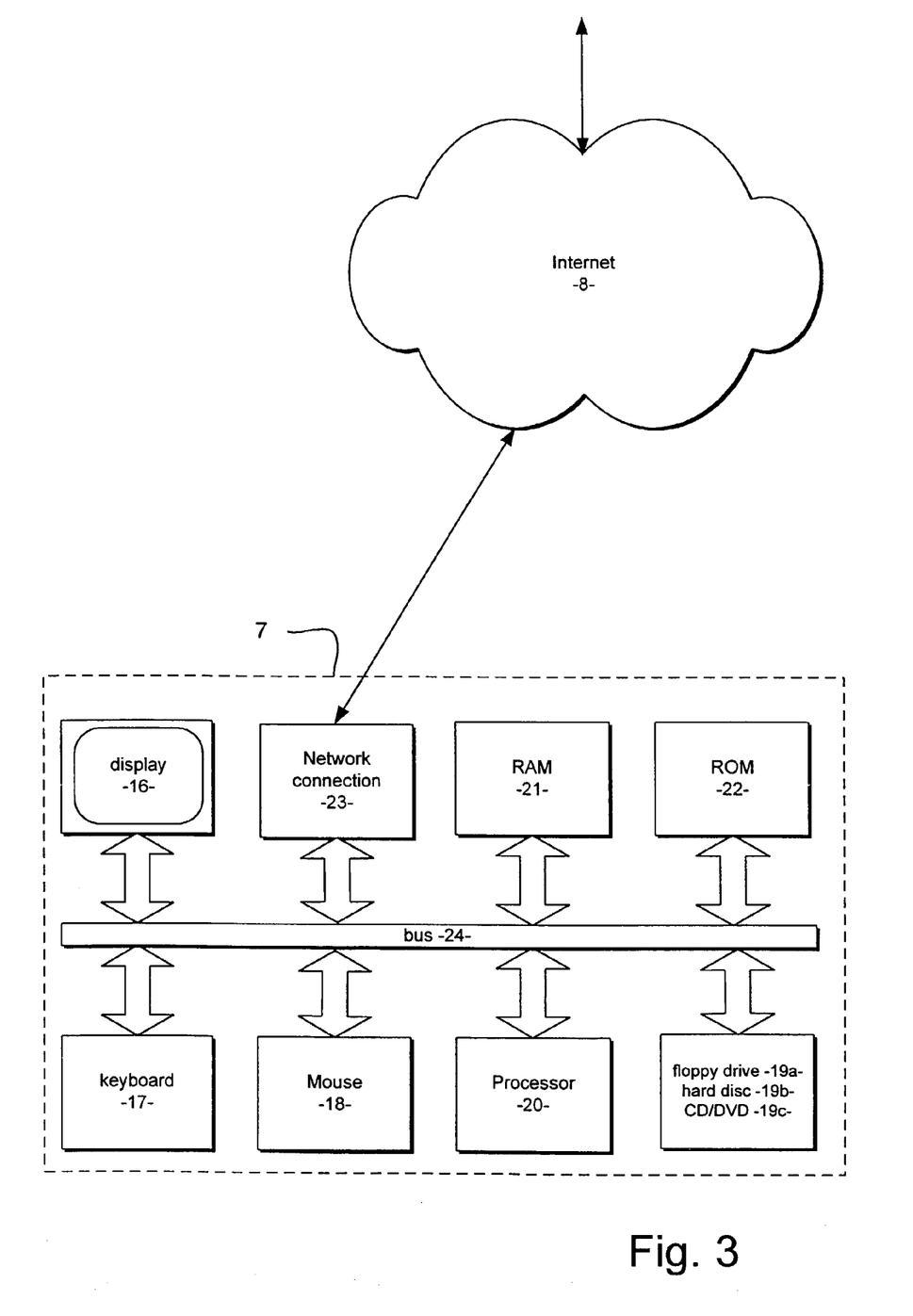
FIG. 3 is a schematic illustration of the workstation shown in FIG. 1.

FIG. 3. The workstation 7 comprises a screen 16 such as a CRT or plasma display, keyboard 17, mouse 18, storage device 19, typically a floppy disk drive 19a, hard disc 19b and CD or DVD ROM drive 19c, processor 20, RAM 21, ROM 22 and network connection 23 such as a modem or ISDN interface. The aforementioned components are interconnected by a common bus 24 as well known in the art.

Figure 4:
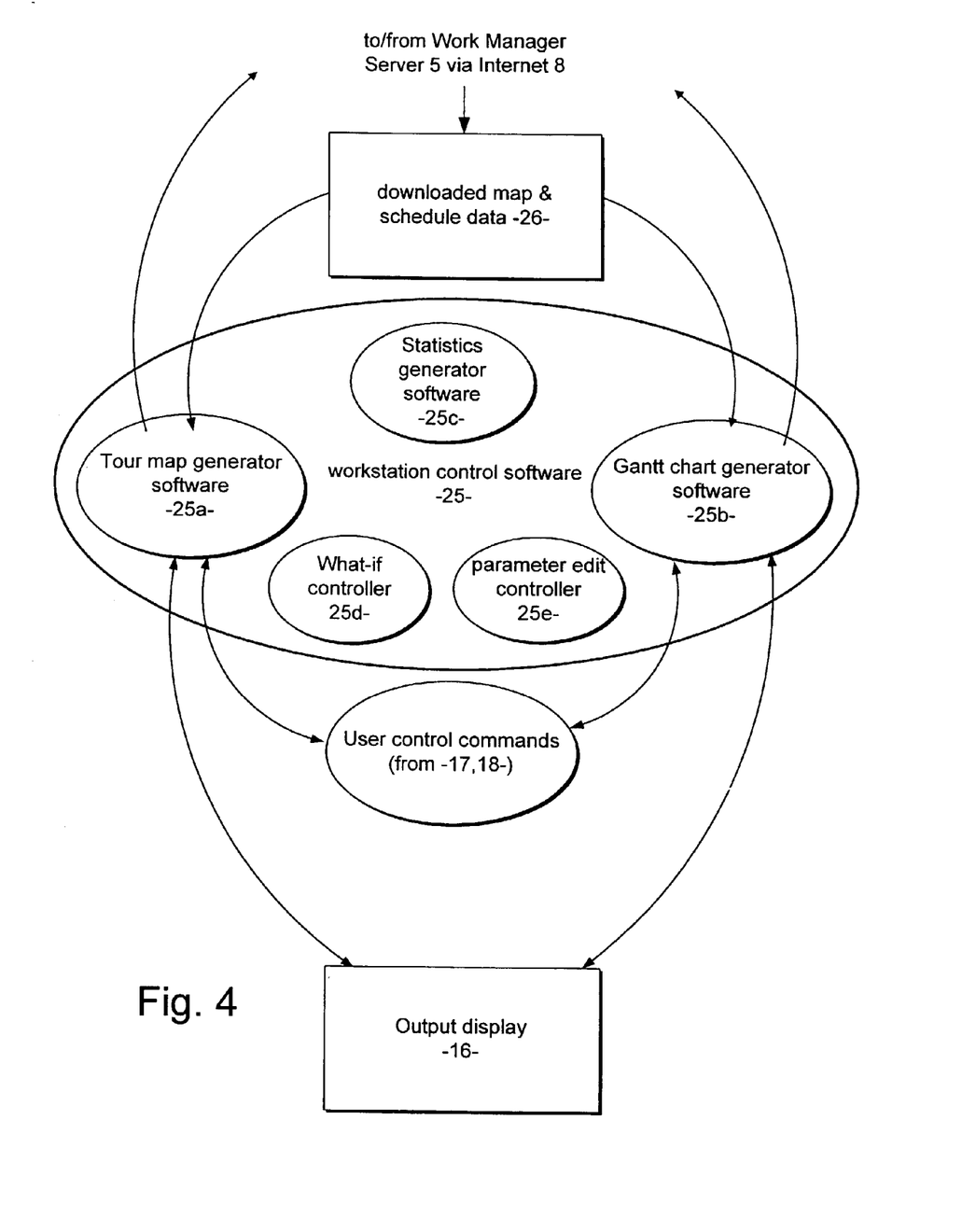
FIG. 4 illustrates schematically the processes performed by the workstation.

Referring to FIG. 4, control software 25 running on the workstation 7 provides five main displays for the output display 16.

A first display comprises a Tour Map produced by tour map generation software 25a. This comprises a visual display of the locations of tasks to be performed by the engineers, on a map downloaded from the map server 14. Arrows showing the paths of an engineers as they move from task to task on their schedule can be displayed.

A second display comprises a Gantt chart produced by a software module 25b which will be described in more detail later.

A third display is produced using a statistics generator 25c and comprises a display of statistics based on the downloaded schedule data. The fourth display concerns what-if enquiries made on the scheduler 10 using the what-if server 12 and the fifth display is provided by a parameter editor module 25e which allows the scheduler parameters 15 to be modified and uploaded to the scheduler 10.

The form of the display is controlled by user control commands generated by means of the keyboard 17 and mouse 18.

Downloading Schedule Data

Figure 5:
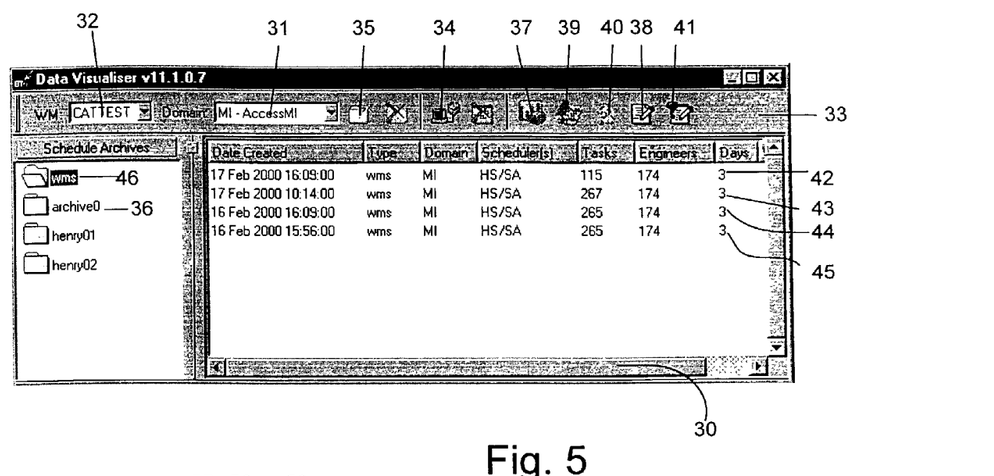
FIG. 5 is an illustration of a main window to receive downloaded schedule data.

The controller at workstation 7 can download schedule data 26 by using a main window 30 illustrated in FIG. 5. Schedules for a particular domain can be selected by means of dialogue box 31. As previously explained, the work manager server 5 may in fact comprise a number of distributed servers around the country and dialogue box 32 permits selection of an appropriate local server.

The window 30 is provided with a button bar 33. Button 34 permits the latest schedule to be downloaded. Button 35 permits schedules to be archived into a selected archive folder 36. Folder 36 is a default archive folder and two other archive folders are shown which have been named by the user. Button 37 selects a statistics display and button 38 selects a parameter editing facility. Button 39 selects a Gantt chart to be described in more detail later and button 40 selects a display of the Tour Map. Button 41 allows a what-if analysis to be performed. Four downloaded schedules 42, 43, 44 and 45 are shown in the window 30, held in a folder wms 46.

Considering the schedule 42 by way of example, it was created on Feb. 17, 2000 at 16.09 hrs and relates to the domain MI which, as can be seen from dialogue box 31, is a domain around Greenford, to the west of London, UK. The schedule has been prepared by the HS/SA technique described previously and includes 115 tasks to be performed by 174 engineers over three days. The data in the file includes, the task data 4 and the engineer data 6 for the domain, together with schedule information produced by the scheduler 10 for each of the 174 engineers who are individually identified by their PINs. The tasks are individually identified by their JINs.

Gantt Window

Figure 6:
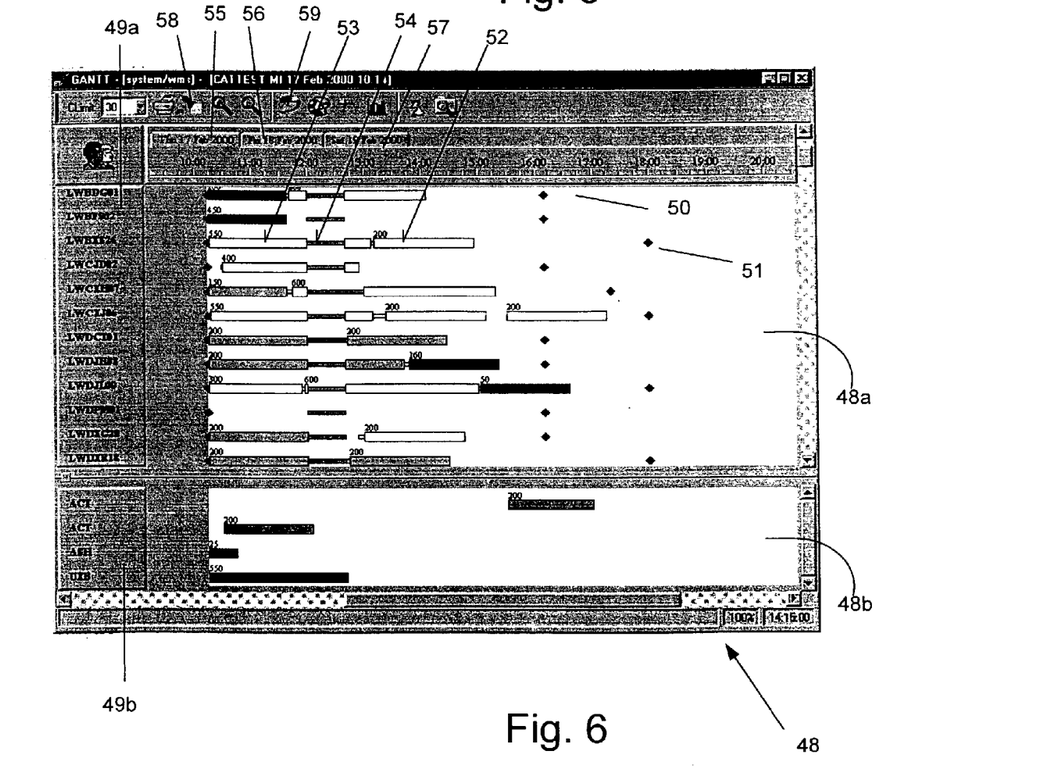
FIG. 6 is a display window for a Gantt chart produced from the downloaded data.

The Gantt chart generator 25b shown in FIG. 4 operates on the schedule data to produce corresponding Gantt charts in a Gantt chart window 48 shown in FIG. 6. The window includes two portions; window area 48a displays scheduled tasks and window area 48b displays unscheduled tasks. On the left hand side of the window, a vertical list 49a of the PINs of the individual engineers is displayed and each has a corresponding time line extending horizontally across the window 48a. Thus for PIN LWBDG01 a time line 50 is provided. Diamond symbols indicate the start and finish of the working day for the engineer concerned. Different categories of work activity are represented by different coloured elongate strips or blocks and a colour code legend is provided in a separate window (not shown). Considering for example the time line 51, the engineer concerned carries out two tasks indicated by strips 52, 53 and undergoes a period of travel 54 between the tasks 52, 53. The tasks are displayed in one colour and the travel time is displayed in a different colour according to the colour code legend.

As previously mentioned, the schedule data files 42–45 each contain schedule data for three successive days and in the Gantt chart of FIG. 6 and the window 48 provides access to individual charts for the three days respectively, which are accessible by means of tabs 55, 56, 57.

The window 48 also has a search facility button 58 that allows the user to search for individual jobs and engineers by PIN and JIN.

Figure 7:
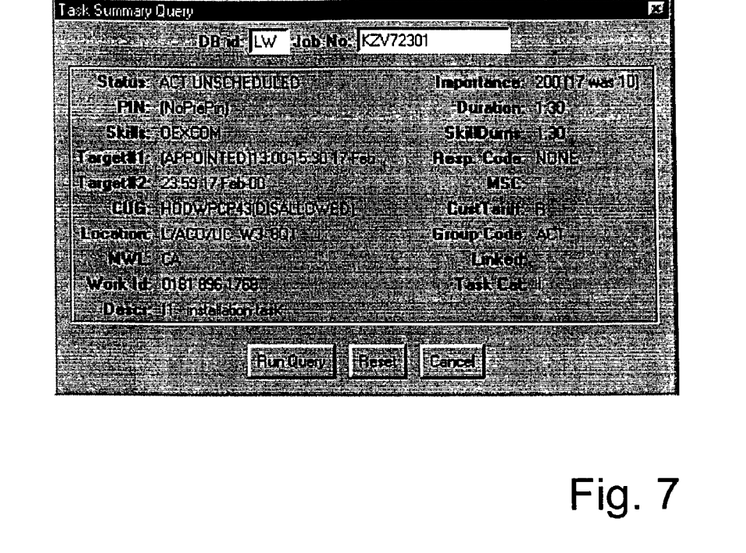
FIG. 7 illustrates a window for a particular task to be performed by an engineer.

Each task is given an importance score by means of the HS/SA scheduler 10. In this example, the tasks 52, 53 have an importance score of 200 and 550 in FIG. 6. Full task details of an individual task can be obtained by clicking the right hand mouse on the task block e.g. task 52 or 53 which provides a drop down menu (not shown) with an option to retrieve full task details from the schedule data, which is displayed in a floating window as shown in FIG. 7.

As previously explained, unscheduled tasks are displayed in window 48b. A list of their codes is given in vertical window 49b.

Contingency

Figure 8:
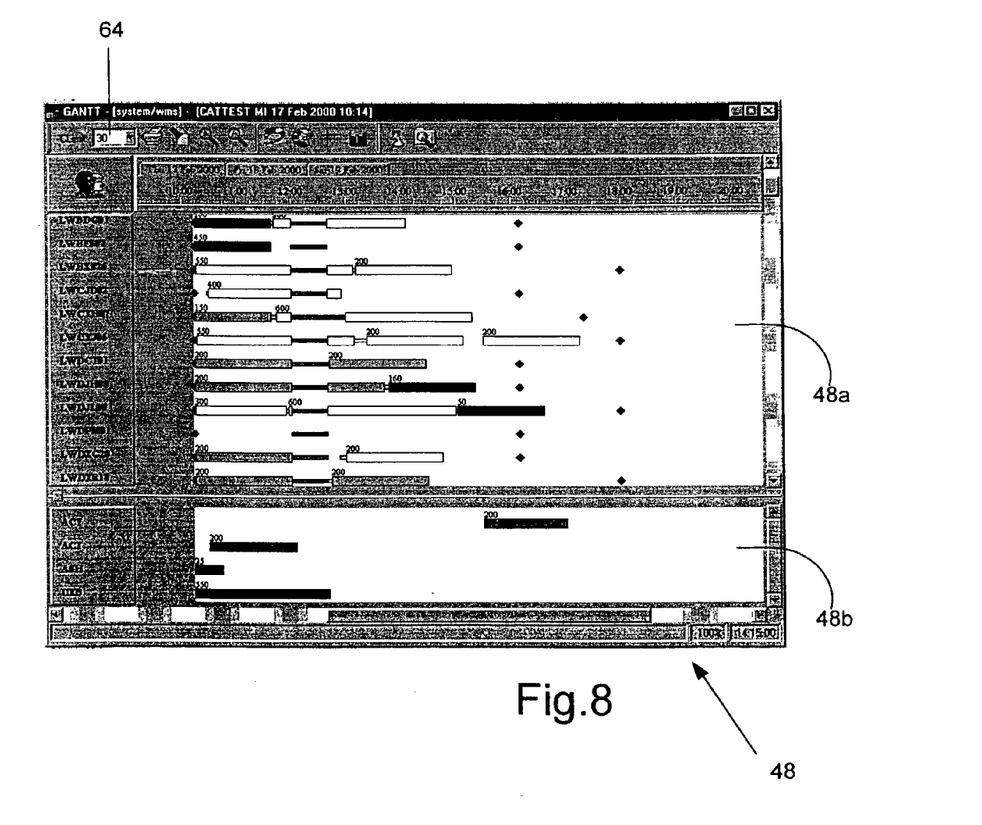
FIG. 8 is a view corresponding to FIG. 6, of the Gantt chart window, when the contingency values are displayed.

Each task in the schedule has a contingency FIG. C associated with it. This comprises the number of "spare" minutes between the start time scheduled for a task and a projected latest feasible start time, projected by the scheduler 10. If the task were to start after this latest start time it would then fail. As an example, for an appointed task, this latest start time is represented by the end of an appointment slot. The Gantt chart shown in FIG. 6 can be operated by using a contingency control button 59 to display the contingency time for each task in a different colour set from the normal display colours. An example of the resulting display of the contingency values is shown in FIG. 8. A suitable contingency value limit "Climit" is set by the user in dialogue box 64 and the colours of the tasks are displayed relative to the set limit value. In this example, the value of "Climit" is set to be 30 minutes. If an individual task has an associated value C less than 30 minutes, it is likely to fail and is displayed on the Gantt chart in a distinctive colour. Tasks with a with progressively higher values of C are displayed using a palette of colours which provide a ready visual indication to the user of the contingency value e.g. shades of green. The display accordingly gives an at-a-glance indication of tasks with a high contingency which are currently safe from failure, those with a relatively low contingency, those which have already failed to be handled by an engineer and those which are shown as being scheduled such that they will fail.

This display of contingency values allows the user at workstation 7 to identify problem areas and make a manual intervention to the scheduling scheme, if needed.

Figure 9:
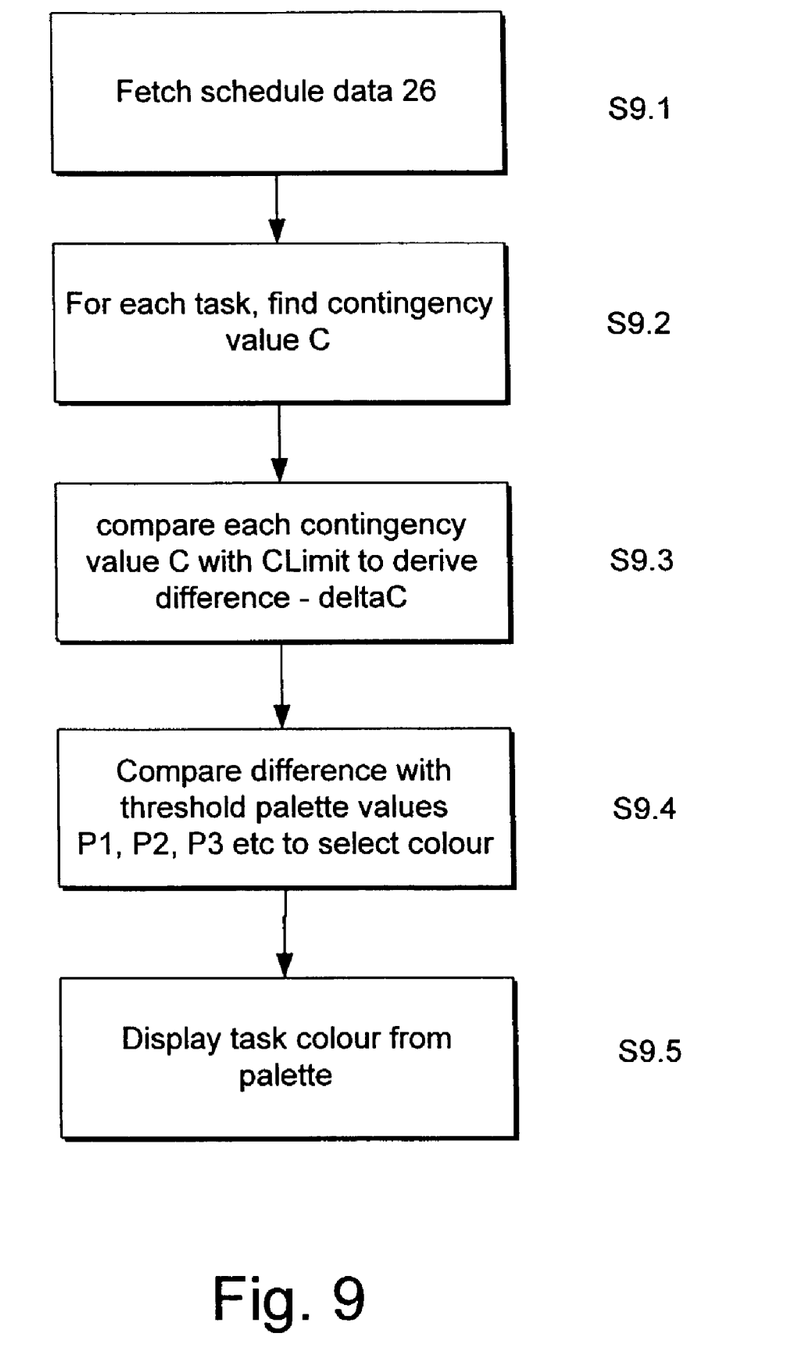
FIG. 9 is a flow chart of a process for selecting display colours for the contingency values in the Gantt chart.

A process for displaying the contingency values is shown in FIG. 9. At step S9.1, the relevant tasks that make up a tour for a particular engineer are fetched at step S9.1. Then, at step S9.2, for each task, the contingency value associated with the task is obtained from the scheduled data.

Then, at step S9.3, the contingency value C for each task is individually compared with the pre-set limit value Climit to derive a difference value $\Delta C$.

Then at step S9.4, the individual values of $\Delta C$ are compared with threshold palette values P1, P2, P3 etc which define upper and lower limits of ranges in which individual palette colours are to be used for the display. Then, at step S9.5, the appropriate colour is selected from the pallet and the individual tasks are displayed in a corresponding colour.

The display can then be returned to the usual Gantt chart display of FIG. 6 by operating the control button 59, so as to return the colours of the various tasks shown on the bar chart to the previously described colour coding scheme. It will be appreciated that operation of the control button does not change the length of the blocks which display the tasks, but adjusts the colours in order to show their individual contingency values C.

Many modifications and variations to the described example of the invention are possible and, whilst the invention has been described in relation to a telecommunications system, it can be used to process tasks relating to other situations where resources need to be applied to carry out the tasks concerned and for example, other situations where field engineers are deployed. The invention could also be used for work scheduling in an industrial process situation. Many other applications will be evident to those skilled in the art.

What is claimed is:

1. A computer-implemented method of scheduling tasks to be performed utilizing a plurality of resources, each said task having a latest feasible start time associated therewith, the computer-implemented method comprising:

receiving schedule data comprising a plurality of schedules, each of the schedules comprising task data indicative of tasks that individual ones of the resources are to carry out, wherein at least some of said task data comprise a scheduled start time for the associated task;

receiving data indicative of a contingency value indicative of a difference between said scheduled start time and the latest feasible start time associated with each task included in the task data;

responsive to input indicative of a specified contingency value, identifying tasks having a contingency value less than said specified contingency value; and displaying said schedule data such that said identified tasks are rendered differently to other tasks included in the schedule data.

2. A computer-implemented method according to claim 1, including displaying the schedule data so that scheduled tasks for the resources are shown individually with an associated visual indication of their contingency values.

3. A computer-implemented method according to claim 2, wherein the scheduled tasks are displayed on a Gantt chart with distinctive colors as a function of their contingency values.

4. A computer-implemented method according to claim 1, wherein the schedule data relate to tasks to be performed on a telecommunications system and the resource data relate to abilities of field engineers to perform the tasks.

5. A computer program product to be run on a computer to schedule tasks to be performed utilizing a plurality of resources, each said task having a latest feasible start time associated therewith, the computer program product comprising:

a computer readable program section for causing the computer to receive schedule data comprising a plurality of schedules, each of the schedules comprising task data indicative of tasks that individual ones of the resources are to carry out, wherein at least some of said task data comprise a scheduled start time for the associated task;

a computer readable program section for causing the computer to receive data indicative of a contingency value indicative of a difference between said scheduled start time and the latest feasible start time associated with each task included in the task data;

a computer readable program section for causing the computer to, responsive to input indicative of a specified contingency value, identify tasks having a contingency value less than said specified contingency value; and a computer readable program section for causing the computer to display said schedule data such that said identified tasks are rendered differently to other tasks included in the schedule data.

6. A computer-readable carrier medium, tangibly embodying a program of instructions executable by a computer to perform method steps for scheduling tasks to be performed utilizing a plurality of resources, each said task having a latest feasible start time associated therewith, the method steps comprising:

receiving schedule data comprising a plurality of schedules, each of the schedules comprising task data indicative of tasks that individual ones of the resources are to carry out, wherein at least some of said task data comprise a scheduled start time for the associated task;

receiving data indicative of a contingency value indicative of a difference between said scheduled start time and the latest feasible start time associated with each task included in the task data;

responsive to input indicative of a specified contingency value, identifying tasks having a contingency value less than said specified contingency value; and displaying said schedule data such that said identified tasks are rendered differently to other tasks included in the schedule data.

7. A method to be carried out by operation of a data processing apparatus in order to execute computer software on the data processing apparatus for use in scheduling tasks to be performed by a plurality of resources, each said task having a latest feasible start time associated therewith, the software including program instructions to enable the data processing apparatus to perform the following steps:

receiving schedule data comprising a plurality of schedules, each of the schedules comprising task data indicative of tasks that individual ones of the resources are to carry out, wherein at least some of said task data comprise a scheduled start time for a task and a contingency value indicative of a difference between said scheduled start time and the latest feasible start time associated with the task;

responsive to input indicative of a specified contingency value, identifying tasks having a contingency value less than said specified contingency value; and displaying said schedule data such that said identified tasks are rendered differently to other tasks included in the scheduling data.

8. A computer-implemented system for scheduling tasks to be performed by a plurality of resources, each said task having a latest feasible start time associated therewith, the system being arranged to receive schedule data comprising a plurality of schedules, each of the schedules comprising task data indicative of tasks that individual ones of the resources are to carry out, wherein at least some of said task data comprise a scheduled start time for a task, and being arranged to receive a contingency value indicative of a difference between said scheduled start time and the latest feasible start time associated with the task, the system comprising:

processing means responsive to input indicative of a specified contingency for reviewing said schedule data so as to identify tasks having a contingency value less than said specified contingency value; and display means for displaying said schedule data such that said identified tasks are rendered differently to other tasks included in the schedule data.

9. A computer-implemented system according to claim 8, wherein the display means is arranged to display the schedule data so that scheduled tasks for the resources are shown individually with an associated visual indication of their contingency values.

10. A computer-implemented system according to claim 9, wherein the scheduled tasks are displayed on a Gantt chart with distinctive colors as a function of their contingency values.

11. A computer-implemented system according to claim 9, wherein the schedule data relate to tasks to be performed on a telecommunications system and the resource data relate to abilities of field engineers to perform the tasks.

* * * * *

UNITED STATES PATENT AND TRADEMARK OFFICE
CERTIFICATE OF CORRECTION

| | | |
|---|---|---|
| PATENT NO. | : 7,082,605 B2 | Page 1 of 1 |
| APPLICATION NO. | : 10/239086 | |
| DATED | : July 25, 2006 | |
| INVENTOR(S) | : Alletson et al. | |

It is certified that error appears in the above-identified patent and that said Letters Patent is hereby corrected as shown below:

TITLE PAGE, ITEM (73) ASSIGNEE: SHOULD READ (73) Assignee: @Road, Ltd. Ipswich (GB)

Signed and Sealed this

Twenty-sixth Day of February, 2008

JON W. DUDAS
*Director of the United States Patent and Trademark Office*